United States Patent
Shen et al.

(10) Patent No.: US 9,576,305 B2
(45) Date of Patent: Feb. 21, 2017

(54) DETECTING COMPETITIVE PRODUCT REVIEWS

(71) Applicant: eBay Inc., San Jose, CA (US)

(72) Inventors: Dan Shen, Shanghai (CN); Shen Huang, Shanghai (CN); Yongzheng Zhang, San Jose, CA (US); Catherine Baudin, Palo Alto, CA (US); Qiang Wang, Shanghai (CN)

(73) Assignee: eBay Inc., San Jose, CA (US)

( * ) Notice: Subject to any disclaimer, the term of this patent is extended or adjusted under 35 U.S.C. 154(b) by 74 days.

(21) Appl. No.: 14/100,686

(22) Filed: Dec. 9, 2013

(65) Prior Publication Data
US 2014/0095408 A1    Apr. 3, 2014

Related U.S. Application Data

(63) Continuation of application No. 12/614,164, filed on Nov. 6, 2009, now Pat. No. 8,620,906.

(51) Int. Cl.
*G06F 17/30* (2006.01)
*G06Q 30/02* (2012.01)
*G06F 17/24* (2006.01)

(52) U.S. Cl.
CPC ....... *G06Q 30/0282* (2013.01); *G06F 17/248* (2013.01)

(58) Field of Classification Search
CPC .... G06Q 30/02; G06Q 50/01; G06Q 30/0203; G06Q 30/0282; G06Q 30/0631; G06Q 30/00; G06Q 30/0201; G06F 17/248; G06F 17/27; G06F 17/2705; G06F 17/2775; G06F 17/2785; G06F 17/30613; G06F 17/30616

USPC ....... 707/736, 748, 948, 722, 740, 741, 749, 707/752, 758, 723; 715/234, 247
See application file for complete search history.

(56) References Cited

U.S. PATENT DOCUMENTS 5,724,571 A * 3/1998 Woods .............. G06F 17/30011
7,693,901 B2    4/2010 Ka et al.
7,813,965 B1   10/2010 Robinson et al.
(Continued)

OTHER PUBLICATIONS

"U.S. Appl. No. 12/614,164, Final Office Action mailed Jul. 6, 2012", 21 pgs.
(Continued)

*Primary Examiner* — Evan Aspinwall
(74) *Attorney, Agent, or Firm* — Schwegman, Lundberg & Woessner, P.A.

(57) ABSTRACT

One embodiment provides a system for recommending products. The system may include a search engine to retrieve, from a collection of product reviews, product review results using at least two input product names. The system may also include a template builder to build comparative sentence templates to define relationships between at least two product names, in which each comparative sentence template has a weight as a function of the defined relationship, and the search engine extracts one or more snippets matching at least one of the comparative sentence templates within each product review result. The system may further include a review ranking device to rank the product review search results based on the one or more extracted snippets, in which each snippet has a same weight as its matched comparative sentence template.

13 Claims, 6 Drawing Sheets

(56) References Cited

U.S. PATENT DOCUMENTS

| | | | |
|---|---|---|---|
| 7,945,571 B2 | 5/2011 | Wanker | |
| 2005/0091038 A1* | 4/2005 | Yi | G06F 17/2715 704/10 |
| 2007/0078671 A1* | 4/2007 | Dave | G06Q 10/10 706/45 |
| 2007/0294127 A1 | 12/2007 | Zivov | |
| 2008/0154848 A1 | 6/2008 | Haslam et al. | |
| 2008/0215571 A1* | 9/2008 | Huang | G06F 17/30719 |
| 2008/0275694 A1* | 11/2008 | Varone | G06F 17/2785 704/9 |
| 2008/0288348 A1 | 11/2008 | Zeng et al. | |
| 2009/0037412 A1 | 2/2009 | Bard et al. | |
| 2009/0138458 A1* | 5/2009 | Wanker | G06F 17/30864 |
| 2009/0216524 A1* | 8/2009 | Skubacz et al. | 704/9 |
| 2009/0281870 A1* | 11/2009 | Sun | G06Q 10/10 705/7.29 |
| 2010/0145940 A1* | 6/2010 | Chen et al. | 707/736 |
| 2011/0004508 A1 | 1/2011 | Huang et al. | |
| 2011/0040759 A1 | 2/2011 | Rappoport et al. | |
| 2011/0113027 A1 | 5/2011 | Shen et al. | |

OTHER PUBLICATIONS

"U.S. Appl. No. 12/614,164, Non Final Office Action mailed Apr. 30, 2013", 18 pgs.

"U.S. Appl. No. 12/614,164, Non Final Office Action mailed Nov. 21, 2011", 15 pgs.

"U.S. Appl. No. 12/614,164, Notice of Allowance mailed Aug. 20, 2013", 6 pgs.

"U.S. Appl. No. 12/614,164, Response filed Feb. 20, 2012 to Non Final Office Action mailed Nov. 21, 2011", 9 pgs.

"U.S. Appl. No. 12/614,164, Response filed Jul. 26, 2013 to Non Final Office Action mailed Apr. 30, 2013", 7 pgs.

"U.S. Appl. No. 12/614,164, Response flied Sep. 10, 2012 to Final Office Action mailed Jul. 6, 2012", 9 pgs.

\* cited by examiner

DETECTING COMPETITIVE PRODUCT REVIEWS

CLAIM OF PRIORITY

This application is a continuation of U.S. patent application Ser. No. 12/614,164, filed on Nov. 6, 2009, the benefit of priority of which is claimed hereby, and of which is incorporated by reference herein in its entirety.

TECHNICAL FIELD

The present application relates generally to methods and systems for detecting competitive product reviews.

BACKGROUND

With the development of computer and network related technologies, more customers (or users) communicate over networks and participate in e-commerce activities. For example, customers may try to find and purchase products (or services) is networks (e.g., the Internet). In many situations, however, it is a time consuming task for customers to find products that meet their demands or interests.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of example embodiments. It will be evident, however, to one skilled in the art that the embodiments of the application may be practiced without these specific details. Embodiments for detecting comparative product reviews are provided. The term "product" in the description denotes either a physical product (e.g., a camera) or a service (e.g., a fitness training program).

Many products in the market have similar functions and prices. It is often difficult for users (or customers) to make choices among competitive products. For example, if a user wants to purchase a DSR camera with a price of about $1000, the user may often feel ambivalent about the purchase of a Canon EOS 400D digital camera vs. a Nikon D80 digital camera, since these two competitive cameras have similar features and prices. In order to make a wise choice, the user may attempt to survey product reviews on the competitive cameras to review comments from others. The product reviews may be obtained via the Internet. Among a large number (e.g., tens or hundreds) of product reviews, comparative product reviews that directly compare features or aspects of the competitive products are more valuable for the user to make wise choices.

Figure 1:
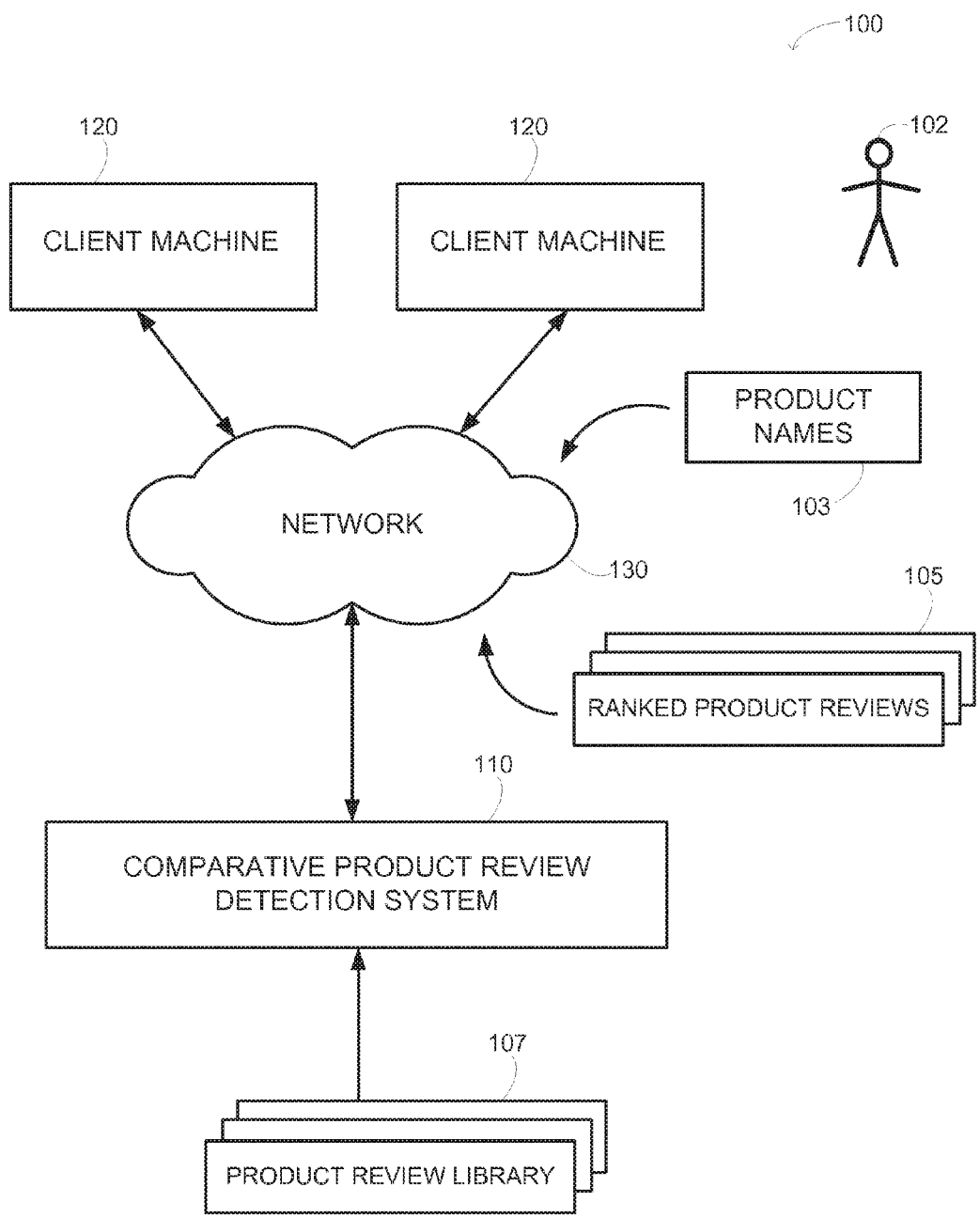
FIG. 1 is an overview diagram illustrating a network system configured to detect comparative product reviews according to an example embodiment.

FIG. 1 is an overview diagram illustrating a network system 100 configured to detect comparative product reviews according to an example embodiment. The network system 100 may include a comparative product review detection system 110 and one or more client machines 120 accessible to a user 102. The comparative product review detection system 110 and the client machines 120 are all coupled to a network 130 (e.g., the Internet).

Figure 2:
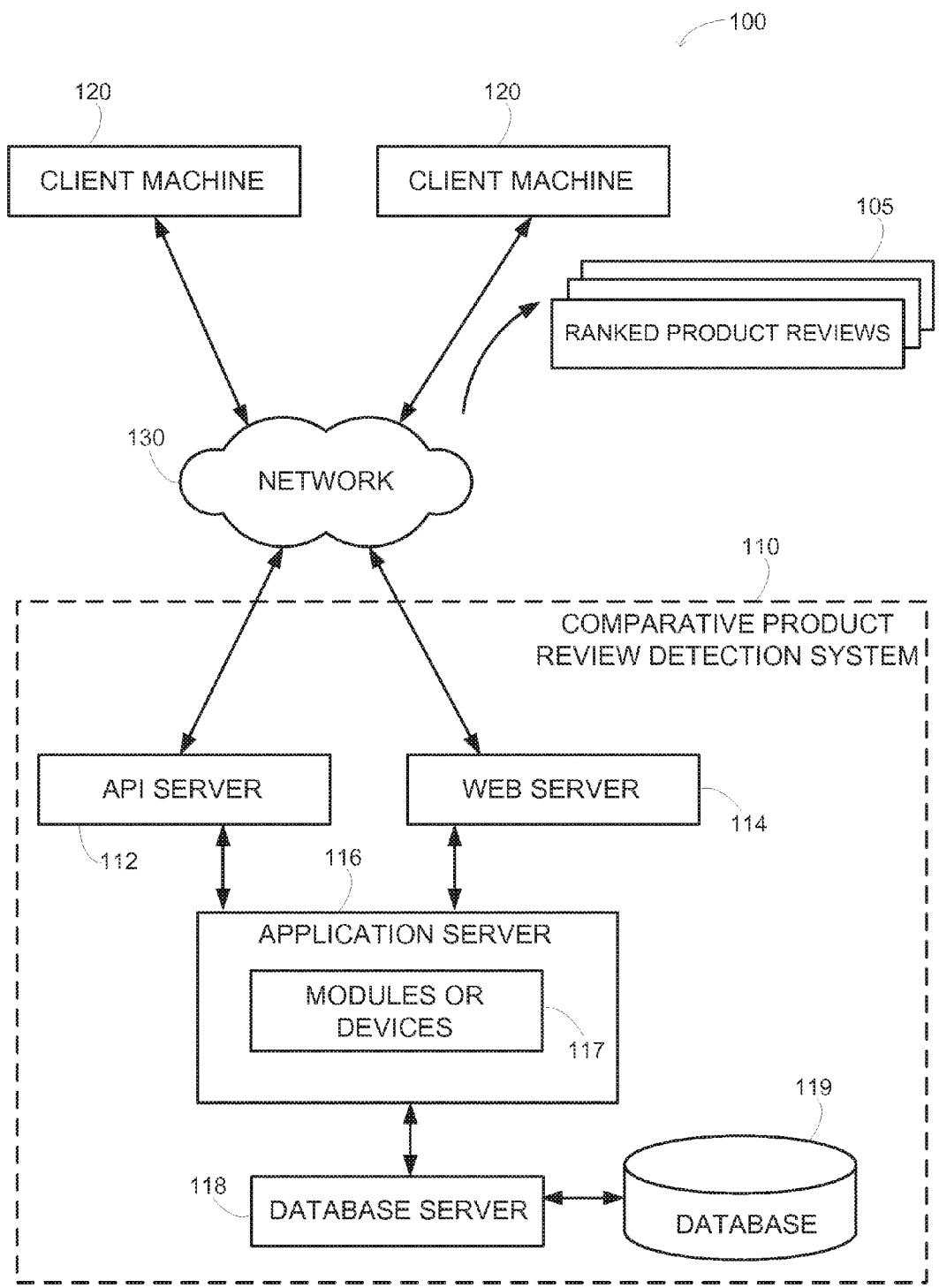
FIG. 2 is a more detailed diagram illustrating the network system as shown in FIG. 1 according to an example embodiment.

In some embodiments, the comparative product review detection system 110 may access a collection of product reviews (e.g., a product review library) 107, which may be stored in a database 119 (as shown in FIG. 2) for example. The comparative product review detection system 110 may receive at least two product names 103 from a client machine 120. The comparative product review detection system 110 may operate to provide the user 102 of the client machine 120 with a list of ranked comparative product reviews 105 based on the received at least two product names 103 and the collection of product reviews 107. The list of ranked comparative product reviews 105 may help to guide the user 102 to choose products that meet the user's demands or interests.

FIG. 2 is a more detailed diagram illustrating the network system 100 as shown in FIG. 1, configured to detect comparative product reviews according to an example embodiment. As shown in FIG. 2, the comparative product review detection system 110 of the network system 100 includes an application program interface (API) server 112, a web server 114, and an application server 116. The API server 112 and the web server 114 are all coupled to the application server 116 and respectively provide programmatic interface and web interface to the application server 116. The application server 116 includes a number of modules (or devices) 117 as shown in detail in FIG. 3, and is coupled to one or more database servers 118 that facilitate access to one or more databases 119, which may store a collection of product reviews (or a product review library) 107.

In some embodiments, the comparative product review detection system 110 may form a platform, which may receive and/or transmit information from and/or to one or more client machines 120, and may also provide server-side functionalities to the one or more client machines 120 over the network 130. The information received by the comparative product review detection system 110 from the one or more client machines 120 may include product names 103 (e.g., "Nikon D80" and "EOS 400D"). The information transmitted from the comparative product review detection system 110 to the one or more client machines 120, in response, may include a list of ranked comparative product reviews 105. The comparative product review detection system 110 may be hosted on a dedicated server machine or on shared server machines that are communicatively coupled to enable communications between these server machines.

It should be noted that the network system 100 as shown in FIGS. 1 and 2 employs a client-server architecture. The term "client-server" denotes a model of interaction in a distributed computer system in which a machine (e.g., a computer) having a program at one site sends a request to a machine (e.g., a computer) having a program at another site and waits for a response. The requesting machine is called the "client," and the machine that responds to the request is called the "server." However, embodiments of the present application are not limited to such a client-server architecture, and could equally well find application in other kinds of architectures, for example, a distributed architecture or a peer-to-peer architecture.

Figure 3:
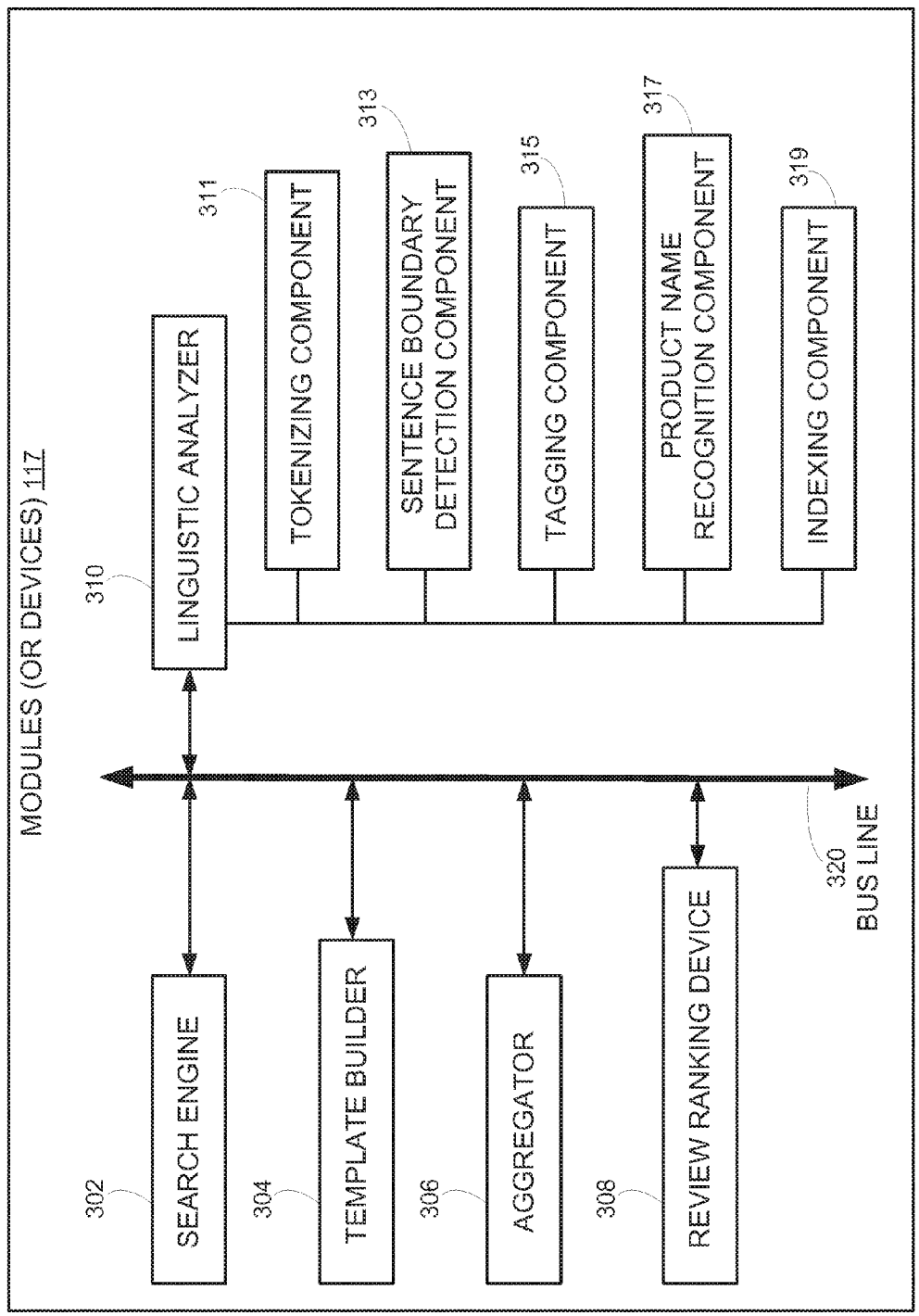
FIG. 3 is a simplified block diagram illustrating modules (or devices) included in a comparative product review detection system as shown in FIG. 2 according to an example embodiment.

FIG. 3 is a simplified block diagram illustrating modules (or devices) 117 included in the comparative product review detection system 110 as shown in FIG. 2 according to an example embodiment. The term "modules" in the description denote subsystems (or parts) of the comparative product review detection system 110. The modules 117 can be, for example, devices, components, hardware, software or combination thereof. The modules (or devices) 117 can be independently created and used to perform multiple functionalities or services.

In some embodiments, the modules (or devices) 117 of the comparative product review detection system 110 may include, but are not limited to, a search engine 302, a template builder 304, an aggregator 306, a review ranking device 308, and a linguistic analyzer 310. The comparative product review detection system 110 may also include one or more processors (not shown), which may be operable to execute the modules (or devices) 117 to provide multiple functionalities or services. The modules (or devices) 117 themselves are communicatively coupled to each other and to various data sources via either appropriate interfaces or a bus line 320, so as to allow information or data to be communicated or shared among the modules (or devices) 117.

In some embodiments, the search engine 302 may retrieve, from a product review library (or a collection of product reviews) 107, a list of product review results using at least two product names 103 (e.g., "Nikon D80" and "EOS 400D"). The at least two product names may be entered by a user 102 via the client machine 120 for example. Each of the list of product review results (e.g., tens or hundreds of camera reviews) includes both of the product names 103.

In some embodiments, the template builder 304 may build comparative sentence templates to define relationships between the at least two products. A "comparative sentence template", as used herein, refers to a sequence of fill-in-the-blank slots such as ProductName1, ProductName2 and a relationship phrase (e.g., "better than", "the same as", "not as good as" etc) defining a relationship between ProductName1 and ProductName2. Each comparative sentence template may have a weight as a function of the defined relationship between two products names. The comparative sentence templates may be operable to capture corresponding snippets existing in the retrieved product review results. The weight of each captured snippet may have a weight the same as the corresponding comparative sentence template.

In some embodiments, the aggregator 306 may calculate a ranking score of each product review result by aggregating weights of the extracted snippets within each product review result.

In some embodiments, the review ranking device 308 may rank the product review search results based on the calculated ranking score of each product review result. For example, the review ranking device 306 may rank the product review results in the order of their calculated ranking scores.

In some embodiments, the linguistic analyzer 310 may tag product reviews. For example, the tokenizing component 311 of the linguistic analyzer 310 may tokenize each product review of the list of product reviews into pieces or tokens. The sentence boundary detection component 313 of the linguistic analyzer 310 may segment each product review into constituent sentences. The tagging component 315 of the linguistic analyzer 310 may label the tokens with syntactic labels, such as "finite verb," "gerund," or "subordinating conjunction". The product name recognition component 317 of the linguistic analyzer 310 may recognize product names in each product review. The indexing component 319 of the linguistic analyzer 310 may index the product names in each product review.

Figure 4:
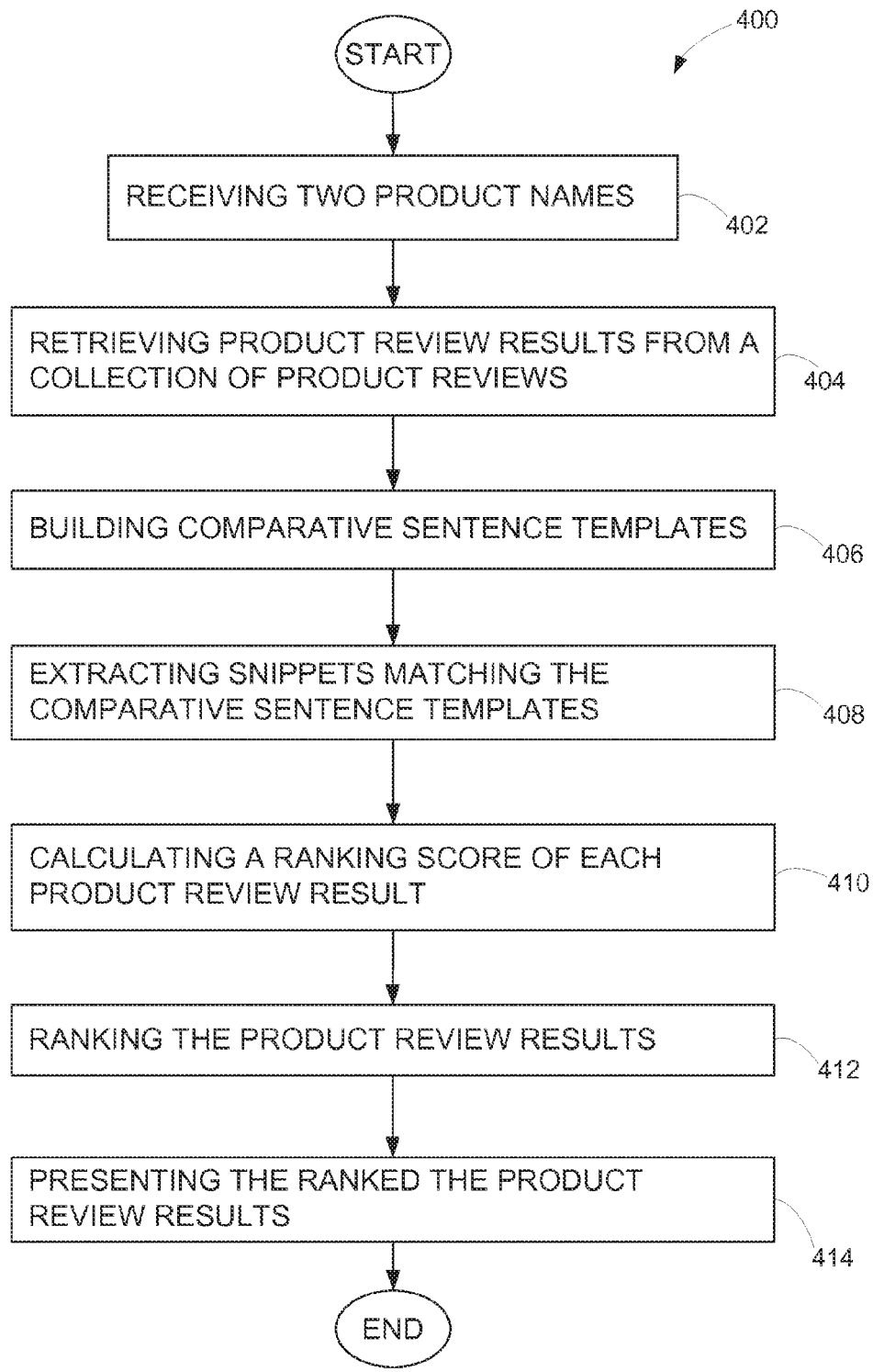
FIG. 4 is a flow diagram illustrating a method of detecting comparative product reviews according to an example embodiment.

FIG. 4 is a flowchart illustrating a method 400 of detecting comparative product reviews via a network in accordance with an embodiment of the present application.

In some embodiments, at operation 402, a client machine 120 may receive at least two product names (e.g., "Nikon D80" and "EOS 400D"), which may be input from a user 102 via one of the client machines 120.

At operation 404, the search engine 302 may use the at least two received product names (e.g., "Nikon D80" and "EOS 400D") to retrieve product review results from a collection of product reviews, which may be stored in a data storage. Each retrieved product review result includes both of the at least two received product names.

At operation 406, the template builder 304 may build comparative sentence templates to define relationships between the at least two product names. In some embodiments, the comparative sentence templates may be stored in a data storage. Each comparative sentence template may be assigned a weight based on the defined relationship.

At operation 408, the search engine 302 may extract snippets that match at least one of the comparative sentence templates from the product review results. Each extracted snippet has the same weight as the corresponding comparative sentence template.

At operation 410, the aggregator 306 may calculate a ranking score for each retrieved product review result by aggregating weights of all the extracted snippets within each product review result.

At operation 412, the review ranking device 308 may rank the retrieved product review results based on the calculated ranking scores of the retrieved product review results. In some embodiments, the retrieved product review results are ranked in the order of their calculated ranking scores. For example, the higher a calculated ranking score of a product review result is, the higher the product review result is ranked. In some embodiments, the review ranking device 308 may rank the retrieved product review results as a function of the extracted snippets. Each snippet has a same weight as its matched comparative sentence template.

At operation 414, a display (not shown) of one of the client machines 120 may present the ranked product review results to a user 102.

Figure 5:
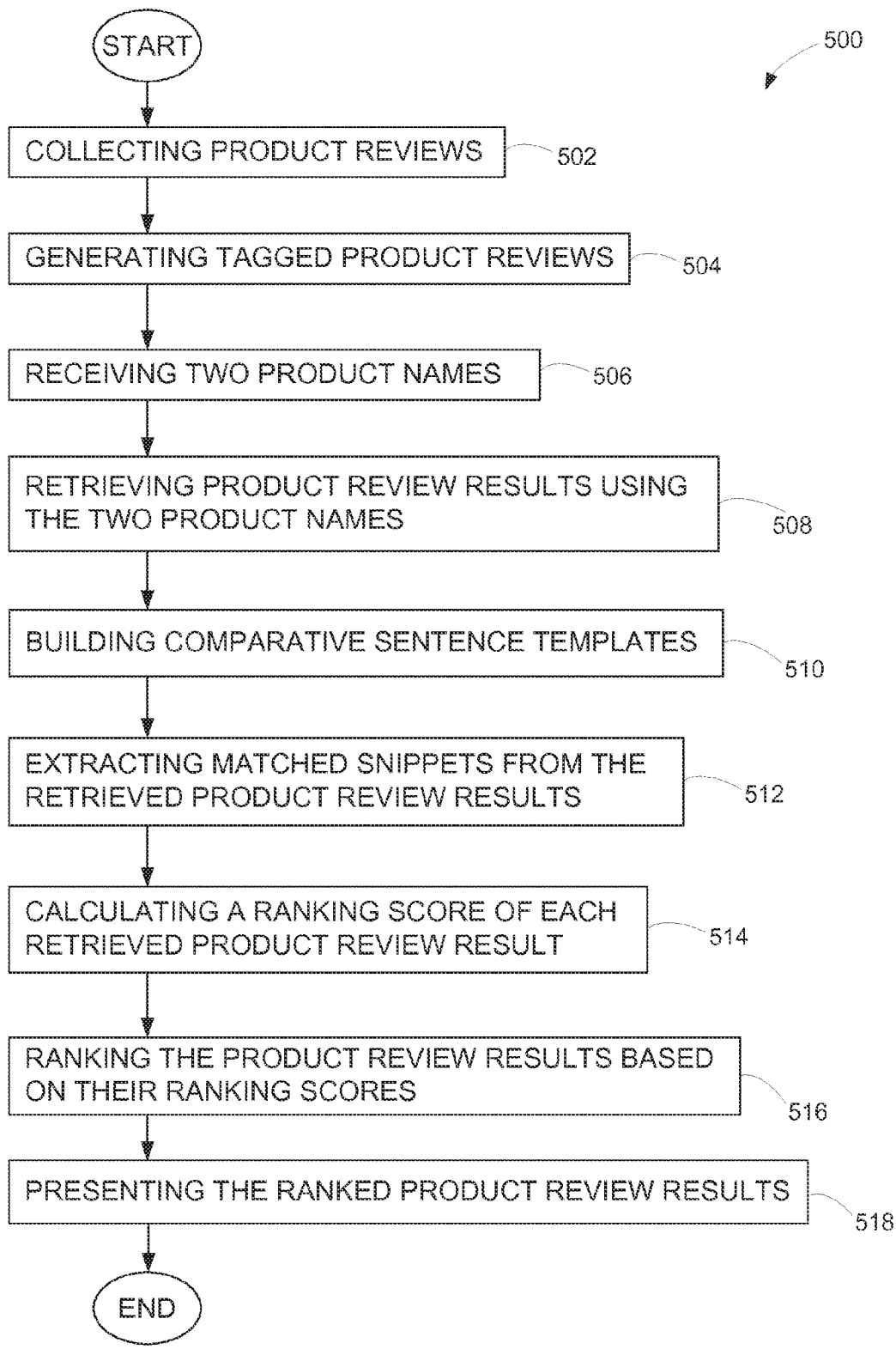
FIG. 5 is a more detailed flow diagram illustrating a method of detecting comparative product reviews according to an example embodiment.

FIG. 5 is a more detailed flow diagram illustrating a method of detecting comparative product reviews according to an example embodiment.

In some embodiments, at operation 502, a list of product reviews may be collected in a first data storage, which may be, for example, a database.

At operation 504, a linguistic analyzer 310 may generate a list of tagged product reviews and save them in a second data storage, which may be, for example, a database. In some embodiments, the linguistic analyzer 310 may tokenize each product review of the list of product reviews into individual tokens, may segment each product review into constituent sentences, may recognize one or more product names in each product review, and may index the one or more product names in each product review.

At operation 506, a client machine 120 may receive at least two product names (e.g., "Nikon D80" and "EOS 400D"), which may be input from a user 102 via one of the client machines 120.

At operation 508, the search engine 302 may use the at least two received product names (e.g., "Nikon D80" and "EOS 400D") to retrieve product review results from the list of collected product reviews stored in the first data storage. Each retrieved product review result includes both of the at least two received product names.

At operation 510, the template builder 304 may build comparative sentence templates to define relationships between the at least two product names. In some embodiments, the comparative sentence templates may be stored in a data storage. Each comparative sentence template may be assigned a weight based on the defined relationship.

Generally speaking, if two products (e.g., "Nikon D80" and "EOS 400D") are frequently mentioned in a same product review (i.e., the same context), these two products are more likely to be comparative. By using extraction techniques, comparative review snippets, such as "To be fair Nikon D80 performs better than Canon EOS 400D, but the differences are much less than they ever used to be" can be extracted from a product review. If a snippet (which includes words/phrases respectively matching all the slots of the comparative sentence template) is found in a sentence of a product review, the sentence of the product review will be recognized as a comparative sentence regarding the two products.

An example comparative sentence template (Comparative Sentence Template 1) is shown as follows:
<ProductName1, adjective/adverb in comparative degree+ "than", ProductName2>
In Comparative Sentence Template 1, the adjective/adverb in comparative degree (e.g. "better", "longer", and "brighter") is followed by "than." ProductName1 and ProductName2 appear on two sides of the phrase adjective/ adverb in comparative degree+"than." The sentence, e.g., "The picture quality of Nikon D80 is better than that of canon 350D . . . " is considered as a comparative sentence between two products ("Nikon D80" and "Canon 350D") because a snippet ("Nikon D80,", "better than," and "Canon 350D") is found in this sentence of camera product review.

In some embodiments, the comparative sentence templates are weighted according to the defined relationships between two products. Generally speaking, a weight of a comparative sentence template defining an explicit relationship between two products is higher than a weight of another comparative sentence template defining an implicit relationship between the two products. Additionally, a weight of a comparative sentence template defining a strong relationship between two products is higher than a weight of another comparative sentence template defining a weak relationship between the two products. For example, the comparative sentence templates, such as <ProductName1, adjective/adverb in comparative degree+"than", ProductName2> or <ProductName1, "as"+adjective/adverb+"as", ProductName2> may have higher weights than the comparative sentence templates, such as <ProductName1, "but"+ProductName2> or <ProductName1+"and"+ProductName2>.

Furthermore, a weight of a snippet having two product names nearly apart is higher than a weight of a snippet having two product names widely apart. Additionally, a snippet including two product names in adjacent sentences has lower weight than a snippet including two product names in the same sentence.

At operation 512, the search engine 302 may extract snippets that match at least one of the comparative sentence templates from the product review results. Each extracted snippet has the same weight as the corresponding comparative sentence template.

At operation 514, the aggregator 306 may calculate a ranking score for each retrieved product review result by aggregating weights of all the extracted snippets within each product review result.

In some embodiments, a product review's ranking score (CompMatch) is the sum of all weights of snippets found in the product review. Additionally, there are other factors that may affect the scores of product reviews. For example, the length of the product review (Len), the percentage of tokens that are adjectives or adverbs (PerAdj), the features of products that occur in the reviews (PFea), e.g., capacity of MP2 players and zoom of a digital camera, and Positive/ negative sentiment words describing products or product features (SentiWord). Therefore, the score (or product relevance Rel) of a product review may be for example based on the following linear interpolation of evidences (or factors):

$$Rel = w_1 \times CompMatch + w_2 \times Len + w_3 \times PerAdj + w_4 \times PFea + w_5 \times SentiWord$$

Where, $w_i$ are the weights of evidence or factor), which can be adjusted.

At operation 516, the review ranking device 308 may rank the retrieved product review results based on the calculated ranking scores of the retrieved product review results. In some embodiments, the retrieved product review results are ranked in the order of their calculated ranking scores. For example, the higher a calculated ranking score of a product review result is, the higher the product review result is ranked. In some embodiments, the review ranking device 308 may rank the retrieved product review results as a function of the extracted snippets. Each snippet has a same weight as its matched comparative sentence template.

At operation 518, a display (not shown) of one of the client machines 120 may present the ranked product review results to a user 102.

Figure 6:
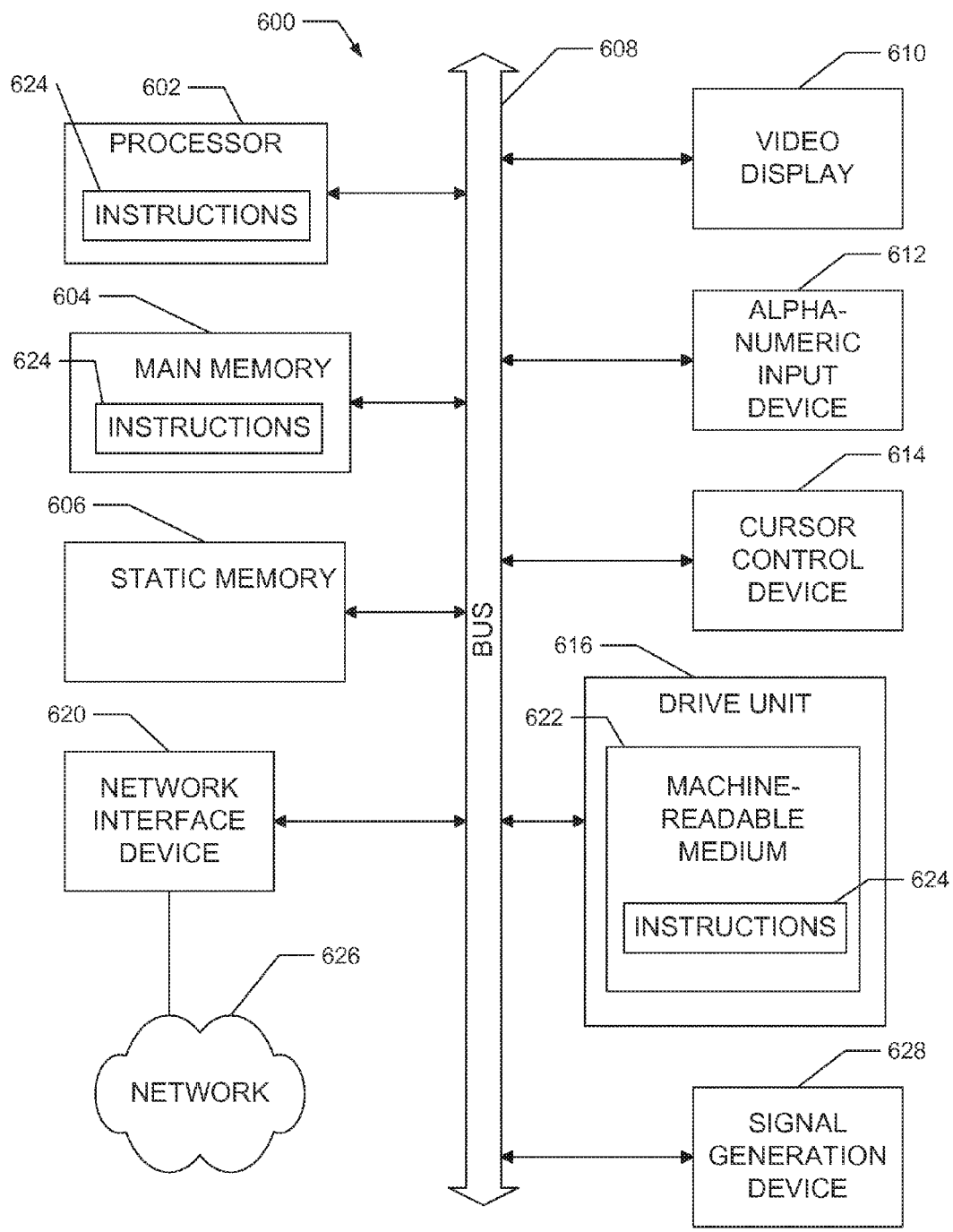
FIG. 6 is a block diagram illustrating a machine in an example form of a computer system according to an example embodiment.

FIG. 6 is a block diagram illustrating a machine in the example form of a computer system 600, within which a set of sequence of instructions for causing the machine to perform any one of the methodologies discussed herein may be executed. In alternative embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 628 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620. While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, methods and systems for detecting comparative product reviews via networks have been described. Although the present application has been described with reference to specific embodiments, it will be evident that various modifications and changes may be made to these embodiments without departing from the broader spirit and scope of the application. Accordingly, the specification and drawings are to be regarded in an illustrative rather than a restrictive sense.

What is claimed is:

1. A system comprising:
   at least one hardware processor;
   a template builder, implemented by the at least one processor, to build comparative sentence templates, each comparative sentence template including at least two product name slots and a relationship phrase to define a relationship between the at least two product name slots, each comparative sentence template having a template weight as a function of the relationship defined between the at least two product name slots, wherein the comparative sentence templates are configured to create comparative sentences by respectively filling the at least two product name slots with at least two product names;
   an interface for receiving user input comprising the at least two product names; a search engine to retrieve product reviews from a data storage using the at least two product names, and to extract snippets from the product reviews using the comparative sentences, each snippet having a snippet weight equal to the template weight of the comparative sentence template corresponding to the comparative sentence used to extract the snippet;
   a linguistic analyzer to tag the product reviews, the linguistic analyzer including a tokenizing component to tokenize each product review into tokens;
   a review ranking device to rank each of the product reviews based on the snippet weights of the snippets thereof and a percentage of the tokens thereof that are adjectives or adverbs; and
   a display to present the ranked product reviews.

2. The system of claim 1, further comprising an aggregator to calculate a ranking score of each product review by aggregating snippet weights within each product review.

3. The system of claim 2, wherein the review ranking device is configured to rank the product reviews based on the ranking scores of the product reviews.

4. The system of claim 1, further comprising an input device to receive the at least two product names.

5. The system of claim 1, wherein the linguistic analyzer further includes a sentence boundary detection component to segment each product review into constituent sentences.

6. The system of claim 1, wherein the linguistic analyzer further includes a tagging component to label the tokens with syntactic labels.

7. The system of claim 1, wherein the linguistic analyzer further includes a product name recognition component to recognize at least one product name in each product review.

8. The system of claim 1, wherein the linguistic analyzer further includes an indexing component to index the at least one product name in each product review.

9. The system of claim 1, wherein the at least two product name slots include at least two fill-in-the-blank slots to be filled.

10. A computerized method comprising:
    building, using one or more processors, comparative sentence templates to define
    relationships between product name slots, each comparative sentence template having a template weight as a function of a relationship defined between the product name slots, with a snippet including two product names in adjacent sentences having a lower weight than a snippet including two product names in the same sentence;
    an interface for receiving user input comprising at least two product names;
    creating comparative sentences using the comparative sentence templates by respectively replacing the product name slots with the at least two product names;
    extracting, from product reviews, snippets matching at least one of the comparative sentences, each snippet having a snippet weight equal to the template weight of the comparative sentence template corresponding to the comparative sentence used to extract the snippet;
    tagging the product reviews by a linguistic analyzer, the tagging comprising tokenizing each product review into tokens;
    ranking each of the product reviews based on ranking scores thereof and a percentage of the tokens thereof that are adjectives or adverbs, the ranking score of each product review being calculated by aggregating snippet weights of each product review; and
    presenting, by a display, the ranked product reviews.

11. The computerized method of claim 10, wherein a template weight of a first comparative template having the product name placeholders nearly apart is higher than a weight of a second comparative template having the product name placeholders widely apart.

12. The computerized method of claim 10, wherein tagging the product reviews by the linguistic analyzer further comprises:
    segmenting the each product review into one or more constituent sentences;
    labeling the tokens with syntactic labels;

recognizing at least one product name in the each product review; and indexing the at least one product name in the each product review.

13. A non-transitory computer-readable storage medium with an executable program stored thereon, the program instructing one or more processors to perform operations comprising:

building comparative sentence templates to define relationships between product name slots, each comparative sentence template having a template weight as a function of a relationship defined between the product name slots;

an interface for receiving user input comprising the at least two product names;

creating comparative sentences using the comparative sentence templates by respectively replacing the product name slots with the at least two product names;

extracting, from product reviews, snippets matching at least one of the comparative sentences, each snippet having a snippet weight equal to the template weight of the comparative sentence template corresponding to the comparative sentence used to extract the snippet;

tagging the product reviews by a linguistic analyzer, the tagging comprising tokenizing each product review into tokens;

ranking each of the product reviews based on ranking scores thereof and a percentage of the tokens thereof that are adjectives or adverbs, the ranking score of each product review being calculated by aggregating snippet weights of each product review; and presenting the ranked product reviews by a display.

* * * * *